March 24, 1964 K. M. TRAMPEL 3,126,537

BINARY TO TERNARY CONVERTER

Filed Dec. 29, 1961

INVENTOR
KURT M. TRAMPEL

BY Edward G. Fiorito

AGENT

United States Patent Office 3,126,537
Patented Mar. 24, 1964

3,126,537
BINARY TO TERNARY CONVERTER

Kurt M. Trampel, Poughkeepsie, N.Y., assignor to International Business Machines Corporation, New York, N.Y., a corporation of New York Filed Dec. 29, 1961, Ser. No. 163,322
6 Claims. (Cl. 340—347)

This invention relates to switching circuits for computers and more particularly to a switching circuit employed in digital computers for converting signals of one radix (e.g. binary signals) into another radix (e.g. ternary signals).

Ternary logic signals are capable of existing at one of three different levels as opposed to the more conventional binary signals which are capable of existing at one of two different levels. Ternary logic has often been found to be more advantageous than binary logic for performing computer operations. A ternary logic computer, however, must frequently accept its input signals from peripheral equipment which operates in binary logic. Therefore, there must be a conversion from binary logic signals to ternary logic signals.

The present invention is in general concerned with converting binary signals into ternary signals. However, the present invention is also concerned with a more specific problem, that of accepting two binary logic signals which are coded to represent a ternary signal and converting them into a single ternary signal.

Accordingly, it is a general object of the present invention to provide an improved circuit for converting information signals of one radix into corresponding signals in another radix.

Another object of the present invention is to provide an improved circuit for accepting and converting two binary signals coded to represent a ternary signal into a single ternary signal.

The coding of two binary logic signals to represent a ternary signal is known as the double rail code. Two binary signals are capable of producing four possible combinations of signals. Only three of these combinations need be coded to represent the three different signal levels of the ternary signal. Therefore, an additional problem encountered in this area of conversion, is one of detecting the excess combination which does not represent one of the ternary signal levels.

An additional object of the present invention is to provide a transistor circuit capable of converting two binary signals coded to represent a ternary signal into a single ternary signal, and adapted to detect combinations of the two binary signals not representing a ternary signal.

These and other objects are accomplished in accordance with the broad aspect of the present invention by providing three potential sources, each source corresponding to one of the levels of the ternary signal. Two switches are provided, each having a control electrode which controls the signals flowing through the switch in response to binary signals applied to the control electrode. The two switches are connected in series between two of the sources causing one or the other of these sources to be switched to an output terminal connected to one of the switches. A diode connects the third source to the control electrode of the switch having the output terminal connected thereto. The diode clamps the binary signal on this control electrode so that the signal on the output terminal is clamped to the level of the third source when one of the switches is conducting and the other is not.

The present invention has the advantage of using a minimum number of components in performing the conversion. Another advantage is that the output signal level is determined by the level of one of the three potential sources and not by the binary signals themselves. The ternary output has sharp well-defined levels, although the binary inputs may have weak or distorted levels.

In accordance with a more specific aspect of the present invention first and second transistor switches are connected in series between two potential sources. Binary input signals are applied to the bases of the switches. A diode connects the third potential source to the base of the first transistor, and the output is taken from the collector of this transistor. When the second transistor is not conducting, the first transistor having its base clamped operates in a saturated condition, the base-collector junction becoming forward biased. Forward biasing of the diode and the base-collector junction clamps the output at the level of the third source.

The foregoing and other objects, features and advantages of the invention will be apparent from the following more particular description of a preferred embodiment of the invention, as illustrated in the accompanying drawings.

Figure 1:
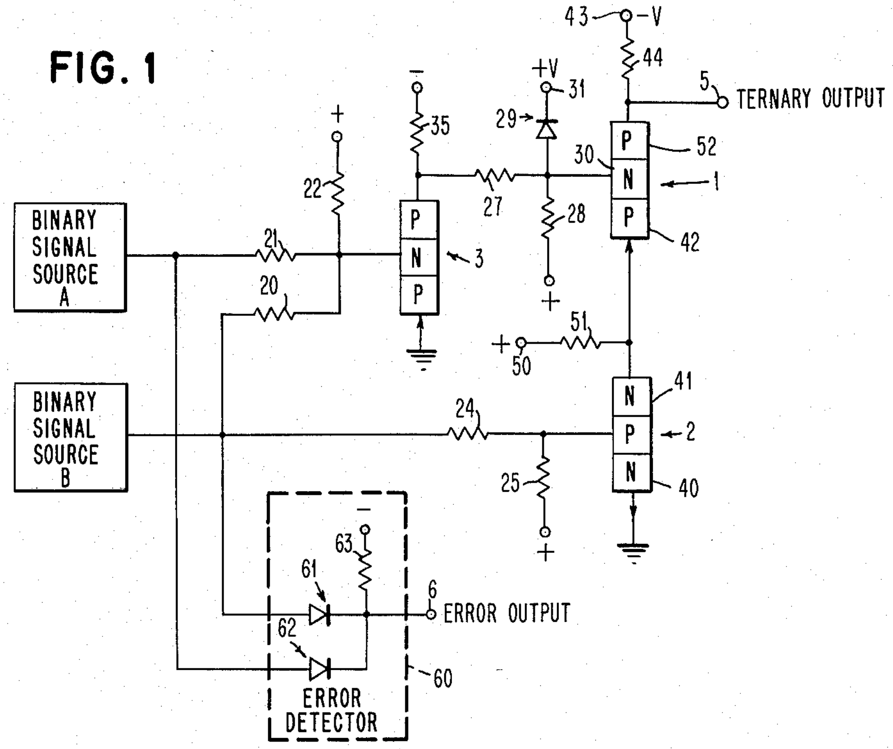
FIG. 1 is a circuit diagram of a binary to ternary converter embodying the principle of the present invention.

In the circuit of FIG. 1 the transistors 1, 2 and 3, are used to perform a binary to ternary conversion. The binary signal sources A and B provide binary signals to the transistors 2 and 3. A ternary output is generated at the ternary output terminal 5. Three of the four possible combinations of the signals from sources A and B (hereinafter referred to as signals A and B, respectively) result in three different voltage levels at the output 5. The fourth combination of the signals A and B results in an error signal at the error output terminal 6.

Figure 2:
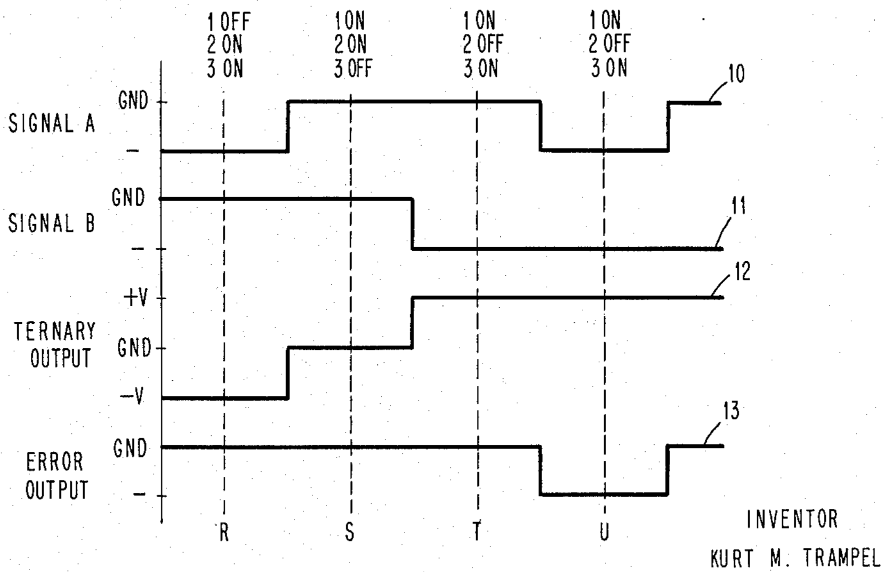
FIG. 2 is a wave form diagram representing the operation of the circuit of FIG. 1.

Referring to FIG. 2, the binary signals A and B are represented by the waveforms 10 and 11, respectively. The ternary output is represented by the waveform 12, and the error output is represented by the waveform 13. The four possible combinations of the signals A and B are represented at the time periods designated R through U. At time R, signal A, is negative and signal B is at ground potential. This combination represents the negative level of the ternary output. At time S, both signals A and B are at ground potential, representing the ground, or intermediate level of the ternary output. At time T, signal A is at ground potential and signal B is negative. This combination represents the positive level of the ternary output, thus completing the three distinct levels of the ternary signal. The fourth combination of the signals A and B is illustrated at time U. At this time, both signals A and B are negative and a negative error output signal is provided at terminal 6 (see FIG. 1). Reference may also be made to waveform 13 in FIG. 2. The on or off (i.e. conducting or non-conducting) condition of the transistors 1—3, (FIG. 1) is listed for each of the times R—U in FIG. 2.

*Detailed Description*

Resistors 20—22 (FIG. 1) are selected so that transistor 3 conducts whenever either one or both of the signals A and B are negative. Resistors 24 and 25 are selected so that transistor 2 conducts only when the signal B is at ground. Transistor 2 is cut off when the signal B is negative. Resistors 27 and 28 are selected so that, when transistor 3 is conducting, the diode 29 is forward biased, clamping the base 30 of transistor 1 at the +V level of the potential source connected to the terminal 31. When transistor 3 is not conducting, a negative signal flows through the resistor 35, causing the diode 29 to be reversed biased, isolating the base 30 from the +V source.

At time R (see FIG. 2), the ground signal from source B causes transistor 2 to conduct. The negative signal from source A causes transistor 3 to conduct, clamping the base 30 at the positive level of the +V source. The emitter 40 of transistor 2 is connected to a potential source, typically ground, which is lower than the level of the +V source. Therefore, the collector 41 and emitter 42 are essentially at the ground level. The base-emitter junction of transistor 1 is reversed biased (N electrode is positive with respect to the P electrode) causing transistor 1 to cut off. The —V source, connected to the terminal 43 is coupled to the output terminal 5 by the resistor 44. Therefore, at time R, (see FIG. 2) the ternary output signal is at the level of the —V source.

At time S, the ground signal from source B causes transistor 2 to conduct. The two ground signals from sources A and B cause transistor 3 to cut off. A negative signal is coupled through resistors 35 and 27 to the base 30. At this time, the base-emitter junction of transistor 1 is forward biased (the N electrode is negative with respect to the P electrode), causing transistor 1 to conduct. Since both transistors 1 and 2 are conducting, the level of the ternary signal on terminal 5 at time S is essentially at the ground level.

The third combination of the signals A and B, which represents one of the ternary output signal level, is shown at time T. The negative signal from source B causes transistor 3 to conduct, thereby clamping the base 30 at the +V level. The negative signal from the source B causes transistor 2 to cut off. When transistor 2 cuts off, the positive source connected to the terminal 50 is coupled through resistor 51 to the emitter 42 of transistor 1. The positive source connected to the terminal 50 is chosen to be greater than the positive level of the +V source connected to the terminal 31 so that the emitter 42 is positive with respect to the base 30. Current flows through the transistor 1 at this time causing a potential rise across the resistor 44. The potential continues to rise until the collector 52 becomes positive with respect to the base 30. At this time, the collector-base junction of transistor 1 becomes forward biased and the potential rise across the resistor 44 can increase no more. The ternary output signal level on terminal 5 is essentially clamped to the +V source through the forward biased collector-base junction of transistor 1 and the forward biased diode 29.

The fourth combination of the signals A and B is illustrated at time U. The operation of the transistors 1—3 is the same as that at time T since the only change in the input signals is in signal A which shifts from the ground level to the negative level. Since transistor 3 conducts in response to one or two negative inputs, the additional negative input A caused no change in its operation. Therefore, an erroneous ternary output is generated at the terminal 5 since this particular combination of the signals A and B is not coded to represent any one of the three ternary output levels. At this time, the error detector 60 provides an error output signal on terminal 6. When either of the signals is at the ground level, at least one of the diodes 61 and 62 is forward biased, providing a positive signal at the terminal 6. At time U, however, both signals A and B are negative, causing a negative signal to be coupled through resistor 63 to the output terminal 6, indicating an error in the signals A and B.

The following is a table of values for the resistors and potential sources found to be suitable for operation of this circuit. These values are set forth by way of example only and the invention is not limited to them, nor any of them.

*Table*

| | | |
|---|---|---|
| Resistor 20 | ohms | 4.7K |
| Resistor 21 | do | 4.7K |
| Resistor 22 | do | 30K |
| Resistor 35 | do | 1.5K |
| Resistor 27 | do | 2.7K |
| Resistor 28 | do | 5.6K |
| Resistor 44 | do | 1.8K |
| Resistor 51 | do | 1.6K |
| Resistor 24 | do | 4.7K |
| Resistor 25 | do | 33K |
| Resistor 63 | do | 10K |
| —V potential source | volts | —6 |
| +V potential source | do | +6 |
| Negative potential source | do | —20 |
| Positive potential source | do | +20 |

The operation of the resistors 20—22 and the transistor 3 is that of the familiar NOR circuit. The output is at the positive level whenever one or both of the inputs is at the negative level. The NOR function of the two signals A and B might very well be available in the computer. It is therefore not necessary in such a case to generate the NOR function of these signals by using the resistors 20—22 and the transistor 3. The NOR function signal can be applied directly to the resistor 27, resulting in the same circuit operation. Furthermore, the circuit of FIG. 1, excluding resistors 20—22 and transistor 3, is useful for converting any two binary signals applied to the resistors 27 and 24 into a single ternary output on terminal 5. The circuit need not perform the specific function of accepting two binary signals coded to represent a ternary signal and convert them into a single ternary output.

From the above detailed description, it is apparent that the level of the ternary output signal is determined by the three potential sources, —V connected to terminal 43, zero potential connected to emitter 40, and +V connected to terminal 31. The ternary output level is, therefore, well defined and accurate. The binary signals from the sources A and B may be weak and distorted and still be capable of causing accurate conduction or non-conduction of the transistors 2 and 3. Another advantage is the minmum number of components used. Where the NOR function of the signals A and B is available elsewhere in the computer, only two active components, transistors 1 and 2, are required.

Transistors 1 and 3 are illustrated to be of the PNP conductivity type, while transistor 2 is illustrated to be of the opposite NPN conductivity type. The conductivity types of the transistors may readily be interchanged by merely reversing the polarity of the potential sources about the ground level and reversing the forward bias direction of the diodes.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A switching circuit for converting two binary input signals into a ternary output signal comprising:

first and second switches each having control electrode means for controlling the conduction of signals therethrough and for accepting respective ones of said two binary input signals;

first, second and third potential sources corresponding to the levels of the ternary output signal, said first and second switches being serially connected between said first and second sources;

an output terminal connected at a point intermediate the first switch and the source connected thereto;

unilateral conducting means connecting the third source to the control electrode means of the first switch; and means included in the control means of said first switch for clamping the signal on the output terminal when the first switch is conducting and the second switch is not conducting.

2. A switching circuit for converting two binary input signals having first and second states into a ternary output signal comprising:

first, second and third switches, each having control electrode means for controlling conduction of signals therethrough, first, second and third potential sources corresponding to the levels of the ternary output signal, said first and second switches being serially connected between said first and second sources;

circuit means connected to the control electrode means of the third switch for accepting both input signals and for stopping conduction in the third switch only when both inputs are in the second state;

circuit means connected to the control electrode means of the second switch for accepting one of said input signals and stopping conduction in the second switch only when said one of said input signals is in the first state;

means coupling the first and third switches for causing conduction in the first switch only when the third switch is not conducting;

an output terminal connected at a point intermediate the first switch and the source connected thereto:

unilateral conducting means connecting the third source to the control electrode means of the first switch; and means included in the control electrode means of said first switch for clamping the signal on the output terminal when the first switch is conducting and the second switch is not conducting.

3. Apparatus as claimed in claim 2, further characterized by the addition of error detecting means for accepting said binary input signals and providing an error indication only when both input signals are in the first state.

4. A switching circuit for converting two binary input signals into a ternary output signal comprising:

first and second transistors each having a base, emitter and collector electrodes, said base electrodes being capable of accepting said binary input signals and controlling conduction of signals through the transistor;

first, second and third potential sources corresponding to levels of the ternary output signal;

circuit means for connecting the emitter of the first transistor to the collector of the second transistor, the collector of the first transistor to the first source, and the emitter of the second transistor to the second source;

unilateral conducting means connected between the base of the first transistor and the third source; and a bias, including a source of potential greater than the third source, connected to the emitter of the first transistor.

5. A switching circuit for converting two binary input signals having first and second states into a ternary output signal comprising:

first, second and third transistors, each having a base, emitter and collector electrodes;

first, second and third potential sources corresponding to the levels of the ternary output signal;

circuit means connected to the base of the third transistor for accepting the input signals and for stopping conduction in the third transistor only when both of the inputs are in the second state;

circuit means connected to the base of the second transistor for accepting one of the inputs and stopping conduction in the second transistor only when the last mentioned input is in the first state;

coupling means connected between the first and third transistors for causing conduction in the first transistor only when the third transistor is not conducting;

circuit means for connecting the emitter of the first transistor to the collector of the second transistor, the collector of the first transistor to the first source, and the emitter of the second transistor to the second source;

unilateral conducting means connected between the base of the first transistor and the third source; and a bias, including a source of potential greater than the third source, connected to the emitter of the first transistor.

6. Apparatus as claimed in claim 5, further characterized by the addition of error detecting means for accepting the binary inputs and providing an error indication only when both inputs are in the first state.

References Cited in the file of this patent

UNITED STATES PATENTS

| | | |
|---|---|---|
| 2,700,696 | Barker | Jan. 25, 1955 |
| 3,024,368 | Nagy | Mar. 6, 1962 |